Oct. 16, 1956     I. W. SILVERTHORNE     2,766,544
FISH LURE
Filed Jan. 5, 1956
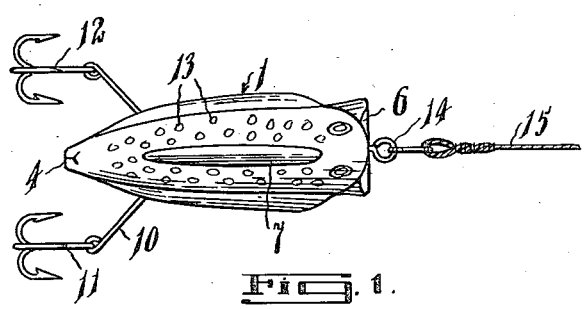
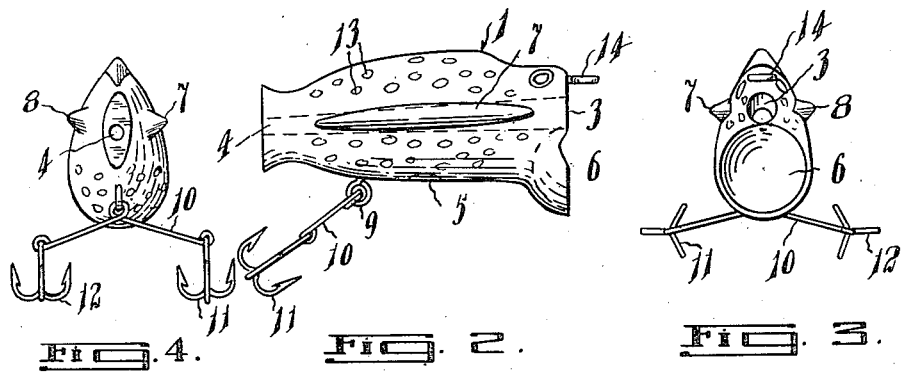
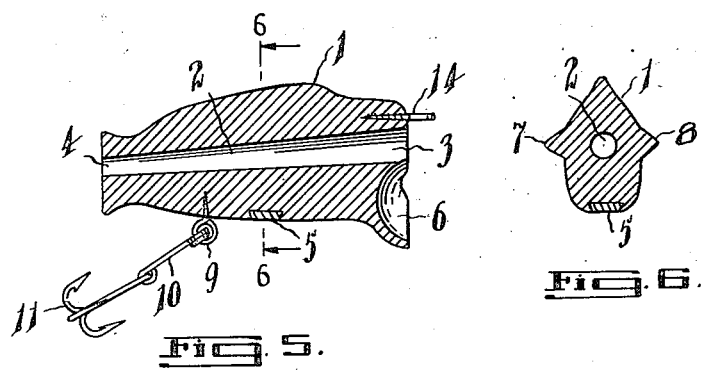
INVENTOR
IRA W. SILVERTHORNE
By Frederick C. Bromley
ATTY.

United States Patent Office 2,766,544
Patented Oct. 16, 1956

2,766,544

FISH LURE

Ira W. Silverthorne, Southampton, Ontario, Canada

Application January 5, 1956, Serial No. 557,610

4 Claims. (Cl. 43—42.06)

This invention relates to fish lures.

It is known to provide a fish lure comprised of a main body member, usually including an outer surface contoured and decorated to simulate some variety of fish bait, and a plurality of fish hooks positioned somewhere about the body member and designed to catch and hold a fish when it attempts to swallow the lure.

It is also known to arrange such a lure to have apertures and channels designed to turbulate the water when the lure is towed therethrough.

To successfully ensnare a fish it is necessary to deceive the latter into believing that the object it sees or senses is a desirable article of diet. It is not known with certainty what senses are possessed by game fish, but it is certain that it is difficult to fool them and it is believed with some reason that they are possessed of sensory faculties which are sensitive and able to selectively analize mechanical vibrations and assign to them values representative of some behavior which is familar or otherwise.

There is a body of experience which indicates without ambiguity that fish will follow a bait which they cannot see and turn from it if its vibrations are of a nature to arouse suspicion as to its initially presumed identity.

Prior art efforts to evolve lures which simulate an appropriate bait have not been conspicuously effective for the reason that whereas the design may have simulated very well indeed the appearance, optically, of the appropriate bait, there has not been provided an accurate simulation of behavior, and the applicant has found that the mere wiggling about of the bait in the water does not fool fish whose innate caution has not been overruled by extreme hunger.

It is an object of this invention to provide a lure which when drawn through the water will generate vibrations in the water which nearly, at least, simulate those which would normally emanate from an appropriate live bait.

The applicant recognises the desirability of characterising the optical concept of the bait in accordance with the normal contours which feature an appropriate bait such as a minnow, chub or the like, but regards this as of secondary importance to the requirement of sending forth vibrations in the water which are reasonable facsimilies of those which would arise from a true bait exhibiting natural behavior.

When a bait (such for example as a chub) is swimming swiftly, it radiates numerous discretely directed vibrations. From its tail are radiated substantial cone shaped wave fronts of a pulse-like character whose repetition rate is commensurate with the rate of oscillation of the tail. Vibrations also emanate from the fins and these are directional in lines radial to the direction of swim. There are turbulences around the mouth of the fish which are also pulse-like as the mouth gulps water and then expels it through the gills; the water fronts from this source are related in frequency to the vibration rate of the tail but the direction of radiation of these waves is modified by the action of the gills and of the fins which lie in the gill slip-stream. In general the waves radiated cone-like from the tail are the most clearly defined, and those from the fins next in definition. As long as these vibrations maintain a co-related rhythm and a clear pattern and if they are not interrupted by the intrusion of a foreign mass such as an arrangement of hooks and/or barbs, or a tow cable, a fish may be beguiled, but let so much as one wave front become distorted by a random and unordered pulse, or by a refraction from a barb or hook, and the game-fish is instantly alerted to danger unknown, and is likely to turn away from the bait.

The applicant has discovered how to simulate the vibrations of a true bait without incurring distortion and random vibrations, by means of an unique lure construction.

According to the present invention a fish lure of the kind indicated comprises a body member contoured to simulate the form of a specified bait, a conical fluid channel extending axially through the fore-and-aft length of the said body and characterised by a large aperture at the forward end of the body and a relatively smaller aperture at the tail end thereof, a turbulating cavity positioned in said body member adjacent the said large aperture, barbed hook means positioned rearwardly and below the slip-stream of the said body, and a two line anchor positioned above the said large aperture at the forward end of said body.

In a further aspect there is provided a static stabilizing member designed to define the specific gravity of the lure so as to define its normal static attitude in the water, and in a still further aspect hydro-planes are positioned on the sides of the body to exert rhythmic restraint upon any undue random tendencies of the lure as it is pulled through the water.

In a still further aspect, the lure includes a set of barbed hooks suspended by members reaching downwardly and outwardly, the members being all flexurably articulated and normally falling away out of contact with the inner slip streams and vibration sources generating the wave front which are designed to emanate undistorted in form so as to beguile the game fish.

Experience with prior art arrangements have clearly demonstrated that when the hooks or other appendages of a lure interfere with the radiation pattern of the lure as it swims, the fish will not take the bait, and is apparently warned off by spurious vibrations from parts which dangle in the wrong places, and produce shadows and/or ghosts in the radiation pattern.

The invention will now be more fully explained by reference to the following description of a preferred example of construction, the text being aided by reference to the accompanying drawings wherein:

Figure 1 is a view looking down upon a lure constructed in accordance with the invention;

Figure 2 is a side view of the construction depicted in Figure 1;

Figure 3 is a front-end view thereof;

Figure 4 is a rear-end view thereof;

Figure 5 is a central sectional view of Figure 2 and shows details of the form of a fluid channel and frontal turbulence cavity; and Figure 6 is a section along the lines 6—6 of Figure 5 certain parts being omitted.

Referring now to these figures, 1 is a body member which may be contoured to simulate the principal contours of a small fish, 2 is a conical channel or tube having a relatively large frontal aperture 3 and a smaller tail aperture 4. Tube 2 provides a frusto-conical water passage. 5 is a leaden weight which acts as a static stabilizer and also defines the specific gravity of the lure. This weight is embedded in the bottom portion of the body. 6 is a turbulating chamber or recess which recedes from the front end face at its deepest part. A feature of the construction is that the chamber or recess 6 is of a segmental spherical shape and is located immediately below the wide end 3 of the water passage 2, whereas the anchorage hook 14 is located at a point diametrically above the egress 3. 7 and 8 are dynamic stabilizers in the form of hydro-planes or fins. 9 is a fish hook anchorage and 10 is a hook trailer. 11, 12 are multiple barbed fish hooks or gang hooks. The assembly of 9, 10, 11, 12 is arranged to be yieldably articulated so that the arrangement will trail outwardly, downwardly and rearwardly away from the slip-stream of the body and of the jet of water which will spew forth from 4 when the lure is drawn through a body of water. 13 represents generally a fish-simulating decoration of the body member and 14 is a towing eye.

In operation, the lure is towed by line 15. The eye 14 is above the aperture 3 and therefore the line 15 is kept clear of the wave fronts radiating forward and downward from the cavity 6 and the vortex established at 3. The hydro-planes 7, 8 tend to steady the lure and prevent it from turning over.

The turbulator 6 scoops water near tube entrance 3 and produces a frontal pressure wave such as that which radiates from a live fish when it takes in water. The turbulating water is drawn into 3 and builds up a pressure in the water passage 2. There is a momentary wave attenuation at 3 and 6 and while 6 is re-filling no water enters 3 which is discharging down the passage 2 and sending a burst of water through 4 forming a wave front rearwardly from 4 in a conical pattern. Meanwhile passage 3 fills again and the cycle is repeated, thus producing rhythmic burst of wave energy both fore and aft of the lure in an orderly pattern.

The body 1 is, except for cavity 6, extensively streamlined, and the water, which has turbulated in cavity 6 escapes in part under the hydro-planes which are thus in rhythmic fashion deflected upward and downward causing the lure to weave in the water as though being veered by a fish fin. Wave reflections from these planes radiate outwardly and are of the same order of magnitude and of rhythmic character as those which would be sent out in the same directions by the side fins of a fish.

During the evolution of these wave phenomena the gang hooks 11, 12 and their supports 9, 10 trail well below and to the sides of the source of these vibrations so that the hook devices, shadow in the wave pattern and are obscure and relatively small with the effect that the game fish does not readily become aware of their presence.

Whereas the selected disclosure set forth herein is of an empirical nature and may not exactly define the best directive structure to exactly simulate a free-moving natural bait, the construction generally disclosed does in fact provide a practical degree of simulation and has, in the field of utility proven highly efficient as a fish lure.

It will be evident that various modifications can be made in the construction as to form, size, number of hooks, and the like without departing from the broad spirit of my teachings. Also the exact taper of the fluid passage or channel is not critical and can be varied to provide different pulse rates and to simulate different swimming speeds. Again, the hydro-planes need not be of the form shown and, for some types of bait, simulation may be omitted or modified as grooves or slots on the side of the body. All such modifications are to be regarded as lying within the ambit of the appended claims.

What I claim is:

1. A fish lure comprising an elongated body member having an abrupt frontal end face and having an aperture extending in a general axial direction through the said body member and open to the ends thereof for providing a water passage, said body member further having a turbulating recess in said frontal end face of a substantially segmental spherical shape and located immediately below said water passage, a towing eye secured to said body member and located on said frontal end face at a point above said water passage, and hook devices connected to said body member.

2. A fish lure as defined in claim 1, in which the water passage is the frustum of a cone and has its wide end at the frontal end face of the body member.

3. A fish lure comprising an elongated body member having an abrupt frontal end face and having an aperture extending in a general axial direction through the said body member and open to the ends thereof for providing a water passage, said body member further having a turbulating recess in said frontal end face of a substantially segmental spherical shape and located immediately below said water passage, stabilizers on said body member in the form of diametrically arranged hydro-planes, a towing eye secured to said body member and located on said frontal end face at a point above said water passage, and hook devices connected to said body member.

4. A fish lure as defined in claim 1, in which the body member is fitted with a static stabilizing weight.

References Cited in the file of this patent

UNITED STATES PATENTS

| 360,339 | Cooke | Mar. 29, 1887 |
| 1,609,855 | Bayer | Dec. 7, 1926 |
| 2,112,901 | Anderson | Apr. 5, 1938 |